United States Patent [19]

Watatani et al.

[11] Patent Number: 4,843,488
[45] Date of Patent: Jun. 27, 1989

[54] NOISE ELIMINATION CIRCUIT FOR REPRODUCTION OF AUDIO SIGNALS IN A MAGNETIC TAPE RECORDING AND REPRODUCING APPARATUS

[75] Inventors: Yoshizumi Watatani; Shigeyuki Ito, both of Yokohama, Japan

[73] Assignee: Hitachi, Ltd., Tokyo, Japan

[21] Appl. No.: 283,186

[22] Filed: Jul. 14, 1981

[30] Foreign Application Priority Data

| Jul. 14, 1980 | [JP] | Japan | 55-95100 |
| Sep. 3, 1980 | [JP] | Japan | 55-121050 |
| Sep. 3, 1980 | [JP] | Japan | 55-121051 |
| Apr. 22, 1981 | [JP] | Japan | 56-59872 |
| Apr. 22, 1981 | [JP] | Japan | 56-59870 |
| Apr. 22, 1981 | [JP] | Japan | 56-59871 |

[51] Int. Cl.$^4$ .......................... H04N 5/78; G11B 5/04; G11B 15/12
[52] U.S. Cl. ...................... 360/19.1; 360/30
[58] Field of Search .................. 360/33, 38, 64, 19, 360/33.1, 38.1, 19.1

[56] References Cited

U.S. PATENT DOCUMENTS

| 3,099,708 | 7/1963 | Smith | 360/64 |
| 3,346,702 | 10/1967 | Heizer et al. | 360/7 X |
| 3,553,390 | 1/1971 | Krause | 360/64 |
| 3,911,476 | 10/1975 | Keizer | 358/343 X |
| 4,021,852 | 5/1977 | Huist et al. | 360/64 X |
| 4,403,262 | 9/1983 | Ito et al. | 360/19.1 |

FOREIGN PATENT DOCUMENTS

1011724 12/1965 United Kingdom ............ 360/64
1537411 12/1978 United Kingdom .

Primary Examiner—Aristotelis M. Psitos
Attorney, Agent, or Firm—Antonelli, Terry & Wands

[57] ABSTRACT

In a magnetic recording and reproducing apparatus in which a frequency-modulated video signal and a frequency-modulated audio signal are frequency-multiplexed and the frequency-multiplexed signal is recorded on video tracks of a magnetic tape, and the recorded signal is reproduced, a noise produced in the audio signal due to video track switching in the signal reproduction is eliminated by holding the audio signal for a period of noise duration.

5 Claims, 9 Drawing Sheets

NOISE ELIMINATION CIRCUIT FOR REPRODUCTION OF AUDIO SIGNALS IN A MAGNETIC TAPE RECORDING AND REPRODUCING APPARATUS

BACKGROUND OF THE INVENTION

The present invention relates to a noise elimination circuit for eliminating noise in an audio signal in a magnetic tape recording and reproducing apparatus for recording and reproducing a video signal, and more particularly to a noise elimination circuit for eliminating noise in an audio signal in a video tape recorder/reproducer which simultaneously records a video signal and the audio signal in a common record track in a frequency-multiplexed form and reproduces it.

In a conventional magnetic recording and reproducing apparatus which records a television signal derived by receiving a television broadcasting wave or a television signal derived from a television camera on a magnetic tape and reproduces it therefrom, a video signal and an audio signal are usually recorded on separate record tracks. More particularly, the video signal and the audio signal contained in the television signal are separated from each other and the video signal is used to modulate a carrier signal and the modulated signal is recorded on the magnetic tape by one or more rotary magnetic head (video head). The record tracks for the video signal recorded on the magnetic tape are orthogonal or oblique to the direction of travel of the magnetic tape so that a higher relative speed between the magnetic tape and the magnetic head is attained. On the other hand, the audio signal is recorded on an upper edge or a lower edge of the magnetic tape along the direction of travel of the magnetic tape by a stationary head (audio head).

In such a magnetic recording and reproducing apparatus, in order to record a long time television signal on a given length of magnetic tape, the width of the record tracks for the video signal is shortened and the speed of the magnetic tape is decreased so that the space between adjacent video tracks is shortened as much as possible. When the speed of the magnetic tape is reduced such that the adjacent video tracks almost contact each other, a high signal-to-noise ratio (S/N) of the recorded video signal can be maintained because the video head for recording the video signal records the video signal on the magnetic tape while it is rotating and hence the relative speed between the magnetic tape and the video head is sufficiently high.

However, since the audio signal of the television signal is recorded in a zero modulation condition on the magnetic tape along the direction of travel of the magnetic tape as is done in a conventional audio tape recorder, high frequency components of the audio signal are not recorded when the speed of the magnetic tape is reduced and the quality of the recorded audio signal is degraded to make it inapplicable to practical use.

It has been proposed therefore to record the audio signal and the video signal together on the video tracks by the video head. In such a recording system, an audio carrier signal of 1 MHz, for example, is frequency modulated by the audio signal and the resulting modulated signal is allotted to a frequency band which is lower than a frequency band of the video signal, and those two signals are simultaneously recorded on the video tracks of the magnetic tape by the video head. According to this recording system, since the relative speed between the video head and the magnetic tape is high, for example, approximately 4 m/sec, the audio signal can be recorded with a sufficiently high signal level over an entire range of the audio frequency band.

In general, when the video signal is recorded on the magnetic tape orthogonally or obliquely to the direction of travel of the magnetic tape, one single field of the video signal is recorded on a track of the magnetic tape extending from the upper end to the lower end or from the lower end to the upper end and the next single field of the video signal is recorded on the next adjacent video track. Thus, when the recorded signal is reproduced by the video head, the reproduced video signal is discontinuous track by track and not continuous.

When the frequency-multiplexed video signal and the audio signal are recorded on the video tracks, the audio signal reproduced is also discontinuous track by track as is the video signal. An affect by the discontinuity of the video signal does not appear on the picture tube of the television receiver because the video signal is recorded on the respective video tracks field by field and the switching from one video track to the next occurs during the flyback period of the television signal. However, when the audio signal is discontinuous, it causes noise which is reproduced by the speaker.

The video signal recorded on the video tracks also contains a horizontal synchronizing signal of the television signal. Thus, when the video signal and the audio signal are recorded on the same track, a periodic noise related to the horizontal synchronizing signal is created in the audio signal due to the nonlinearity of a magnetic circuit including the magnetic tape and the video head. Accordingly, it is necessary to eliminate such noise.

SUMMARY OF THE INVENTION

It is, therefore, an object of the present invention to provide a noise elimination circuit for use in a magnetic recording and reproducing apparatus which eliminates noise produced in the audio signal without deteriorating the sound quality of the audio signal.

In accordance with the present invention, in a magnetic recording and reproducing apparatus which records a frequency-multiplexed audio signal and a video signal on the magnetic tape orthogonally or obliquely to the direction of travel of the magnetic tape and reproduces the recorded signal, the audio signal is held for a predetermined time period in synchronism with track switching in a reproduction operation to eliminate the noise produced in the track switching.

BRIEF DESCRIPTION OF THE DRAWINGS

The present invention will be apparent from the following detailed description taken in conjunction with the accompanying drawings, in which.

DETAILED DESCRIPTION OF THE PREFERRED EMBODIMENT

Figure 1A:
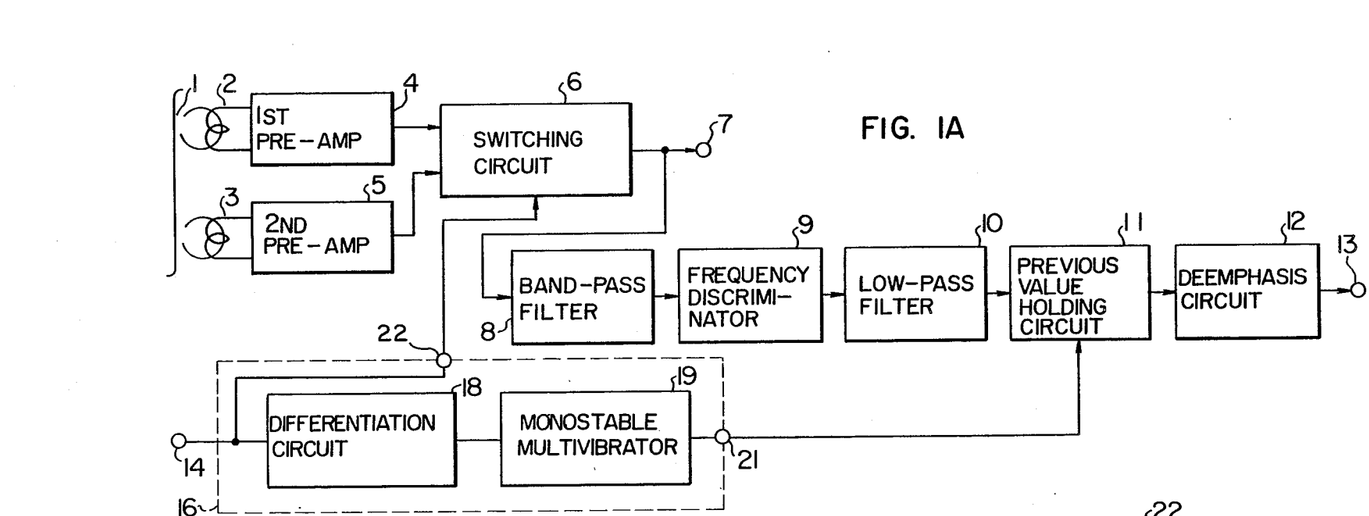
FIG. 1A shows a block diagram of an audio reproducing circuit of a magnetic recording and reproducing apparatus which employs a noise elimination circuit of the present invention.

The noise elimination circuit in the magnetic recording and reproducing apparatus of the present invention will now be described with reference to the preferred embodiments shown in the accompanying drawings. FIG. 1 shows a block diagram of one embodiment of a reproducing circuit for reproducing an audio signal of the magnetic recording and reproducing apparatus in which the noise elimination circuit of the present invention is embodied. In FIG. 1, numeral 1 denotes a magnetic tape which is wrapped around a rotating cylinder, not shown, during recording and reproducing operations.

Recording heads and reproducing heads contact the magnetic tape I while they are rotating so that a video signal and an audio signal are simultaneously recorded on video tracks or they are simultaneously read therefrom. Numerals 2 and 3 denote first and second reproducing video heads which may be common with the recording video heads. The video heads 2 and 3 are mounted on the rotating cylinder with a spacing of 180 degrees from each other and rotate with the rotating cylinder to alternately scan adjacent video tracks of the magnetic tape 1. The video heads 2 and 3 read the audio signal and the video signal recorded on the video tracks. The first reproducing head 2 is connected to a first pre-amplifier 4 so that the video signal and the audio signal read by the first reproducing head 2 are amplified by the first pre-amplifier 4. The second reproducing head 3 is connected to a second pre-amplifier 5 so that the video signal and the audio signal read by the second reproducing head 3 are amplified by the second pre-amplifier 5. An output terminal of the first pre-amplifier 4 and an output terminal of the second pre-amplifier 5 are connected to input terminals of a switching circuit 6. Since the first and second reproducing heads 2 and 3 alternately scan the video tracks of the magnetic tape 1 to read the signal recorded thereon, the outputs of the first and second reproducing heads 2 and 3 must be switched, that is, switched track by track in synchronism with the rotation of the reproducing heads 2 and 3. The switching circuit 6 selects the output signals of the first and second pre-amplifiers 4 and 5 in synchronism with the rotation of the reproducing heads 2 and 3 so that the output signal from the first pre-amplifier 4 and the output signal from the second pre-amplifier 5 are alternately joined to produce a continuous reproduced signal. An output of the switching circuit 6 is applied to a video signal output 7 and an input terminal of a band-pass filter 8. The continuous output signal derived from the track-by-track switching of the switching circuit 6 contains the video signal, the audio signal which is at a lower frequency band than that of the video signal and a chrominance signal which is at a lower frequency band than that of the audio signal. The band-pass filter 8 passes only the audio signal among those signals and supplies it to a frequency discriminator 9. The video signal and the chrominance signal contained in the output signal from the switching circuit 6 are taken from the video signal output terminal 7 for the process in a video signal processing circuit. The frequency discriminator 9 detects the frequency-modulated audio signal to produce an audio-frequency signal. This signal is supplied to a low pass filter 10 to eliminate a carrier component and an output signal from the low-pass filter 10 is supplied to a previous value holding circuit 11 which holds the signal level of the audio signal which was present immediately before the switching circuit 6 switches the output signals of the first and second pre-amplifiers 4 and 5, each time such switching takes place. During a signal holding period, the signal path for the audio signal is blocked so that noise produced when the output signals of the pre-amplifiers 4 and 5 are switched is blocked. The signal holding circuit 11 holds the signal only for the period during which the noise is produced. During a time period other than the signal switching period, the output signal from the low-pass filter 10 passes through the signal holding circuit 11 and is supplied to a deemphasis circuit 12. Since the audio signal has its high frequency components pre-emphasized in the frequency modulation process, the high frequency components are deemphasized in the deemphasis circuit 12 which provides an output signal at an output terminal 13.

Numeral 16 denotes a track switching synchronizing signal generation circuit which comprises a differentiation circuit 18 and a monostable multivibrator 19 connected to the output of the differentiation circuit 18. The input of the differentiation circuit 18 is connected to an input terminal 14 to which a track switching signal is applied. The output of the monostable multivibrator 19 is connected to a first output terminal 21 of the signal generation circuit 16, which in turn is connected to the previous value holding circuit 11. The signal generation circuit 16 further has a second output terminal 22 which is directly connected to the input terminal 14 and to a control input of the switching circuit 6. The track switching signal applied to the input terminal 14 is produced in synchronism with the rotation of the first and second video heads 2 and 3. It is produced by sensing the rotating positions of the video heads 2 and 3.

Figure 1B:
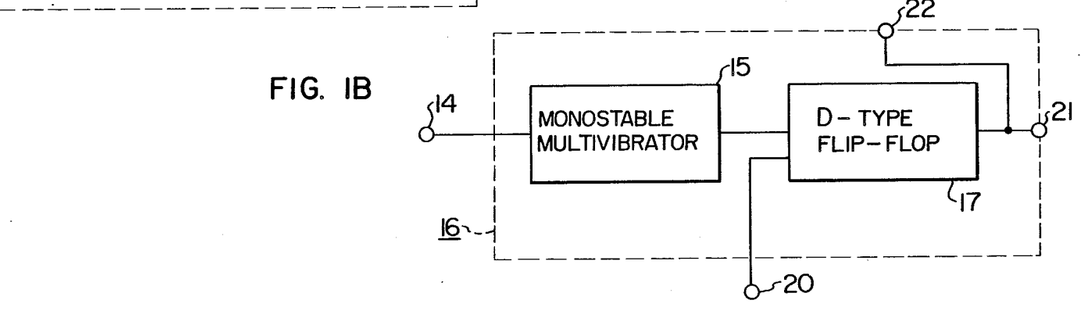
FIG. 1B shows a block diagram of a track switching synchronizing signal generation circuit in accordance with the present invention.
Figure 2:
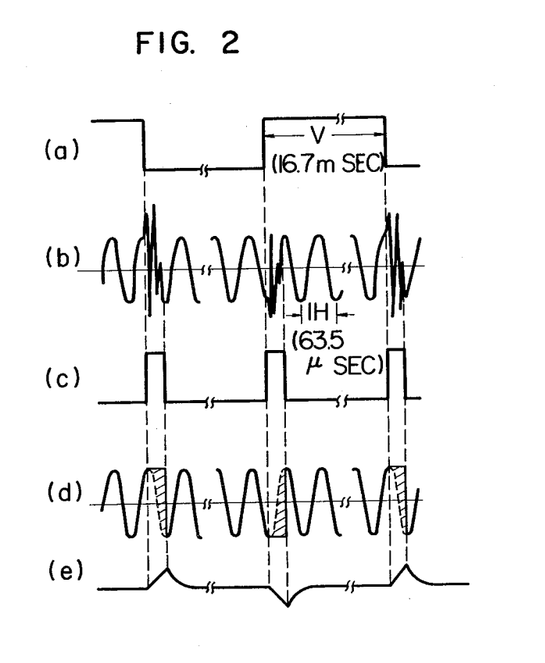
FIG. 2, (a) through (e), shows signal waveforms at various points in the circuit of FIG. 1A.

FIG. 2 shows reproduced signal waveforms for illustrating the operation of the noise elimination circuit when a periodic noise related to a horizontal synchronizing signal of the video signal is present in the audio signal and the signal is a voiceless signal. The signal waveform shown in FIG. 2 (a) represents a track switching signal supplied to the input terminal 14 in FIG. 1, the waveform shown in FIG. 2 (b) represents a periodic noise related to the FM-demodulated horizontal synchronizing signal period, the waveform shown in FIG. 2 (c) represents a previous value holding period signal, the waveform shown in FIG. 2 (d) represents a noise held by the previous value holding signal, and the waveform shown in FIG. 2 (e) represents the waveform with the held noise deemphasized.

The track switching signal applied to the input terminal 14 is supplied to the differentiation circuit 18 of the signal generating circuit 16, in which pulse signals synchronized with a rising edge and a falling edge of the track switching signal are produced. The pulse output signals from the differentiation circuit 18 are supplied to the monostable multivibrator 19 to trigger the multivibrator 19 by the output signals so that the previous value holding period signal having a constant pulse duration, as shown by the waveform (c) of FIG. 2, is produced. The output signal from the multivibrator 19 is supplied to the control terminal of the previous value holding circuit 11 through the output terminal 21. The track switching signal applied to the input terminal 14 is also supplied to the switching circuit 16 through the second output terminal 22 of the signal generating circuit 16. The switching circuit 6 alternately selects the output signals of the first and second pre-amplifiers 4 and 5 in synchronism with the track switching signal.

When the output signals from two reproducing heads are joined by the switching circuit 6, it is difficult to match the phases of the output signals from the two reproducing heads and hence the phases are discontinuous at the junction. When the switching circuit 6 is controlled by the track switching signal shown by the waveform (a) of FIG. 2 to effect switching of the tracks, the phase and the amplitude of the periodic noise are disturbed for a period following the switching, as shown by the waveform (b) in FIG. 2, and it creates an additional noise which is different from the periodic noise. Since such a large amplitude noise is produced in a substantially fixed period, the noise produced in the track switching can be eliminated by controlling the previous value holding circuit 11 by the signal (c) of FIG. 2 so that it holds the signal level of the periodic noise presented immediately before the track switching to block the noise produced during the track switching. By attenuating the periodic noise by supplying the output signal of the previous value holding circuit 11 to the deemphasis circuit 12, the output signal which is essentially free from noise as shown by the waveform (e) of FIG. 2 is produced.

While the periodic noise has been discussed above, the noise in the audio signal produced in the track switching can be eliminated similarly.

Figure 4A:
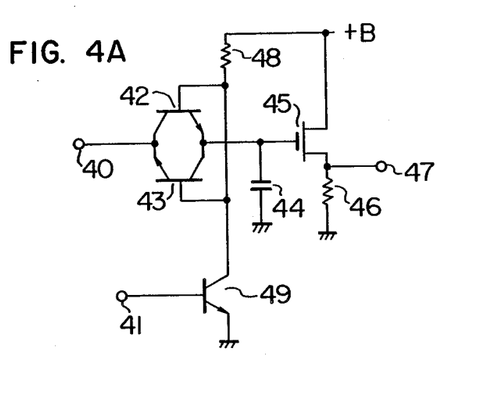
FIG. 4A shows a specific circuit diagram of a previous value holding circuit in accordance with the present invention.

FIG. 4A shows a specific circuit diagram of the previous value holding circuit 11, in which a first input terminal 40 is connected to the output terminal of the low-pass filter 10 of FIG. 1A and a second input terminal 41 is connected to the first output terminal 21 of the signal generation circuit 16. Numerals 42 and 43 denote a pair of switching transistors. The collector of the first transistor 42 is connected to the emitter of the second transistor 43 while the emitter of the first transistor 42 is connected to the collector of the second transistor 43. Bases of the pair of transistors are connected to a positive power supply through a resistor 48 and to a collector of a third switching transistor 49. The emitter of the first switching transistor 42 and the collector of the second switching transistor 43 are connected to a gate of an amplifying transistor 45 and grounded through a holding capacitor 44. The transistor 45 is a MOS FET having its source electrode grounded through a resistor 46 and connected to an output terminal 47.

In this circuit, a previous valve holding period signal is applied to the base of the third switching transistor 49 so that it conducts during a positive pulse period of the signal and is turned off during the remaining period of the signal. The first and second switching transistors 42 and 43 are cut off during the conduction period of the transistor 49 and conduct during the non-conduction period of the transistor 49. Thus, when the transistors 42 and 43 are conductive, the audio signal supplied to the input terminal 40 is supplied to the transistor 45 through the collectoremitter circuits of the respective transistors and an amplified signal is taken from the source electrode of the transistor 45. The signal level of the audio signal which varies from time to time is stored in the capacitor 44. When the previous value holding period signal is supplied from the multivibrator 51 to the transistor 49 to render it conductive, the transistors 42 and 43 are cut off to block the noise. The signal level of the audio signal present immediately before the transistors 42 and 43 are turned off has been stored in the capacitor 44. As the transistors 42 and 43 are cut off, the charged voltage is not discharged but held to maintain the source voltage of the transistor 45 at a constant level. Thus, the signal is held.

By rendering the transistors 42 and 43 nonconductive in synchronism with the track switching operation of the switching circuit 6, the noise produced when the tracks are switched can be blocked.

The circuit shown in FIG. 1A can eliminate the noise produced in the track switching. However, when this circuit is used, a low pulsive noise remains as seen from the waveform (e) of FIG. 2 because the time point of the track switching does not correspond to the zero-crossing point of the period noise. By using the fact that the period of the periodic noise is related to the horizontal synchronizing pulse, the pulsive noise related to the track switching can be prevented by synchronizing the track switching with the zero-crossing of the periodic noise.

FIG. 1B shows another embodiment of the track switching synchronizing signal generation circuit which produces the track switching signal to be supplied to the switching circuit 6 in synchronism with the horizontal synchronizing signal in order to cause the track switching time to coincide with the zero-crossing point of the periodic noise. In FIG. 1B, the horizontal synchronizing signal is supplied to the input terminal 14 of the synchronizing signal generation circuit 16, thence to a monostable multivibrator 15, which is triggered by the horizontal synchronizing signal applied to the first input terminal 14 to produce a clock signal of a fixed pulse duration. The horizontal synchronizing signal applied to the first input terminal 14 is synchronous with the horizontal synchronizing signal contained in the video signal taken from the video signal output terminal 7 and it is supplied from a horizontal synchronizing signal separation circuit of the video signal circuit or a horizontal synchronizing signal oscillator. Numeral 17 denotes a D-type flip-flop having one input terminal to which the output signal of the multivibrator 15 is applied and another input terminal to which the video track switching signal is applied through the second input terminal 20 so that the track switching synchronizing signal is produced in synchronism with the output pulse of the multivibrator 15. The output terminal of the flip-flop circuit 17 is connected to the first and second output terminals 21 and 22 and to the switching circuit 6 and the previous value holding circuit 11 of FIG. 1A so that the switching of the switching circuit 6 is controlled and the holding operation of the previous value holding circuit 11 is controlled by the track switching synchronizing signal. The circuit shown in FIG. 1B may be used in place of the signal generation circuit 16 of the circuit shown in FIG. 1A.

Figure 3:
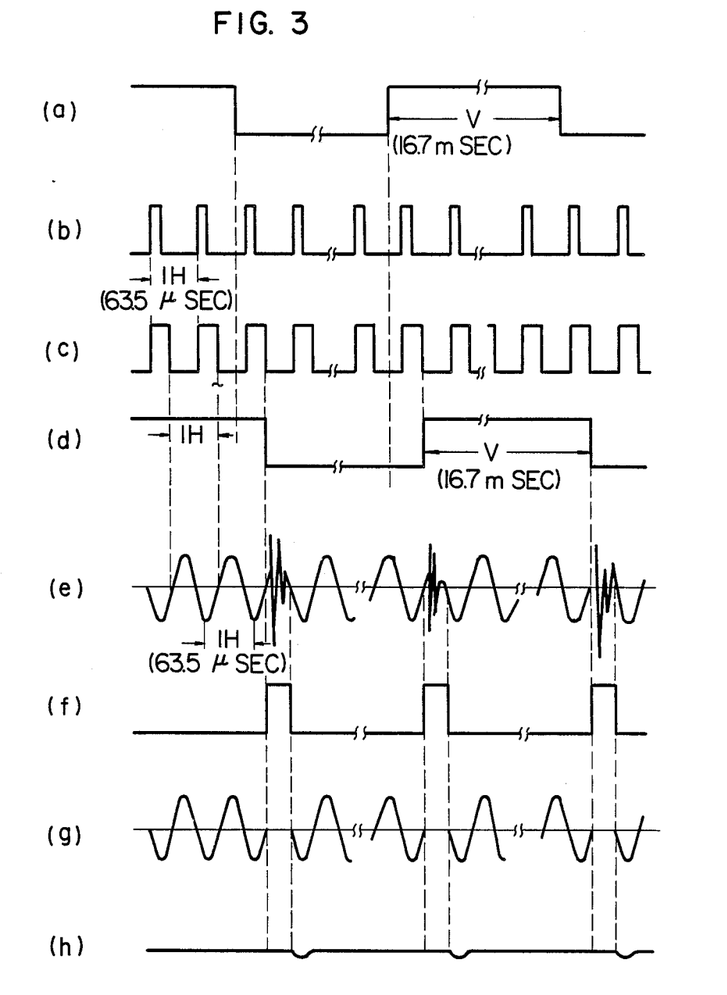
FIG. 3, (a) through (h), shows signal waveforms at various points in an audio reproducing circuit which employs the circuit shown in FIG. 1B.

FIG. 3 shows signal waveforms at various points in the audio signal reproducing circuit which employs the track switching synchronizing signal generation circuit shown in FIG. 1B. In FIG. 3, the waveform (a) represents the video track switching signal supplied to the input terminal 20, which is a 30 Hz pulse signal produced by sensing the rotation position of the reproducing heads 2 and 3. The waveform (b) represents the horizontal synchronizing signal applied to the input terminal 14, the waveform (c) represents a clock pulse generated by the multivibrator 15, the waveform (d) represents the track switching synchronizing signal generated by the flip-flop circuit 17, the waveform (e) represents the periodic noise related to the horizontal synchronizing signal contained in the audio signal, in which the audio signal is when absent, that is, no signal is present but the periodic noise, the waveform (f) represents the previous value holding period signal produced by the previous value holding circuit 11 in synchronism with the rise and the fall of the track switching synchronizing signal, the waveform (g) represents the output signal from the previous value holding circuit 11 and the waveform (h) represents the output signal of the deemphasis circuit 12.

The operation of the circuit of FIG. 1B is now described with reference to the signal waveforms shown in FIG. 3. The horizontal synchronizing signal shown by the waveform (b) of FIG. 3 is applied to the input terminal 14 of FIG. 1B, thence to the monostable multivibrator 15. The monostable multivibrator 15 is triggered by the horizontal synchronizing signal to produce the clock pulse as shown by the waveform (c) of FIG. 3 which has a wider pulse duration than the horizontal synchronizing pulse. The clock pulse is supplied to the D-type flip-flop 17. The 30 Hz track switching signal shown by the waveform (a) of FIG. 3 which is synchronized with the rotation of the reproducing heads 2 and 3 is applied to the input terminal 20, thence to the flip-flop circuit 17. The D-type flip-flop circuit 17 is a delay type flip-flop circuit which is triggered in synchronism with the fall of the clock pulse as shown by the waveform (d) of FIG. 3 to hold the signal level of the current track switching signal when the clock pulse is of high level and holds it during a low level period of the clock pulse. As a result, the track switching synchronizing signal shown by the waveform (d) in FIG. 3 which is a fixed time delayed version of the track switching signal shown by the waveform (a) is produced at the output terminal of the flip-flop circuit 17. The track switching synchronizing signal is in synchronism with the zero-crossing points of the periodic noise shown by the waveform (e) so that the rising edge and the falling edge of the track switching synchronizing signal coincide with the zero-crossing points of the periodic noise. This can be attained by varying the duty ratio of the monostable multivibrator to vary the pulse duration of the clock pulse.

The track switching synchronizing signal produced by the flip-flop circuit 17 is supplied to the switching circuit 6 and the previous value holding circuit 11. The switching circuit 6 alternately selects the output signal of the first pre-amplifier 4 and the output signal of the second pre-amplifier 5 in synchronism with the track switching synchronizing signal. Accordingly, the switching time of the switching circuit 6 coincides with the zero-crossing point of the periodic noise. The previous value holding circuit 11 has a waveform reshaping circuit for producing the previous value holding period signal shown by the waveform (f) of FIG. 3 in response to the track switching synchronizing signal. In the waveform reshaping circuit, the track switching synchronizing signal is differentiated by a differentiation circuit to produce a pulse signal which is in synchronism with the rising and falling edges of the track switching synchronizing signal, and a monostable multivibrator is triggered by the pulse signal to produce the previous value holding period signal having a pulse duration of approximately 50 microseconds. The previous value holding circuit 11 holds the signal level of the periodic noise at the rising edge of the previous value holding period signal and blocks the signal path to block the noise. Since the start time of the signal holding by the previous value holding circuit 11 coincides with the zero-crossing point of the periodic noise, the signal held is of zero level. The signal holding is continued during the time period of the presence of the previous value holding period signal and the signal path is conductive after the termination of the signal holding. As a result, the output of the previous value holding circuit 11 always coincides with the zero level of the periodic noise as shown by the waveform (g) of FIG. 3. Accordingly, the waveform (h) of FIG. 3 is produced at the output terminal 13 and the voltage at the zero-crossing point of the periodic noise can be held without lengthening the previous value holding period. As a result, the pulsive noise of the track switching period due to the periodic noise can be substantially fully suppressed and the quality of the reproduced signal is not deteriorated.

Figure 4B:
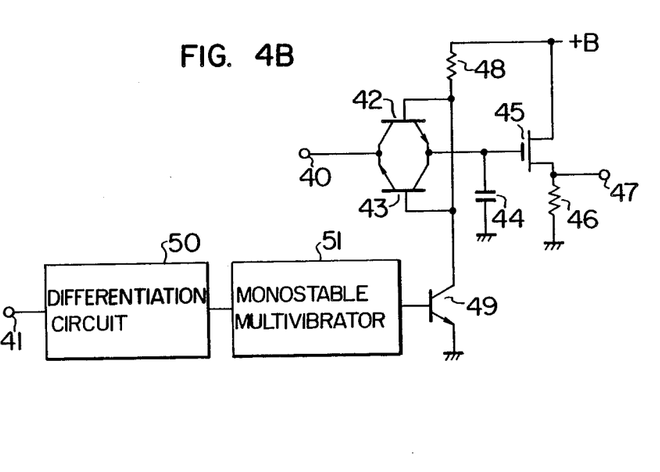
FIG. 4B shows a circuit diagram of a modification of the previous value holding circuit of the present invention.

FIG. 4B shows a specific circuit diagram of the previous value holding circuit when the circuit of FIG. 1B is used. The first input terminal 40 is connected to the output terminal of the low-pass filter 10 of FIG. 1A and the second input terminal 41 is connected to the output terminal 21 of the flip-flop circuit 17 of FIG. 1B. The second input terminal 41 is also connected to the input of a differentiation circuit 50, the output of which is connected to the input of a monostable multivibrator 51. The emitter of the third switching transistor 49 is directly grounded and the base is connected to the output of the multivibrator 51.

In the circuit of FIG. 4B, the track switching synchronizing signal shown by the waveform (d) of FIG. 3 is applied to the input terminal 41. This signal is differentiated by the differentiation circuit 50 which produces a pulse signal which is in synchronism with the rising edge and the falling edge of the track switching synchronizing signal. This pulse signal is supplied to the monostable multivibrator 51 to trigger it so that it produces the previous value holding period signal shown by the waveform (f) of FIG. 3. The previous value holding period signal is supplied to the base of the transistor 49 to control the transistors 42 and 43 in the same manner as the circuit shown in FIG. 4A.

Figure 5:
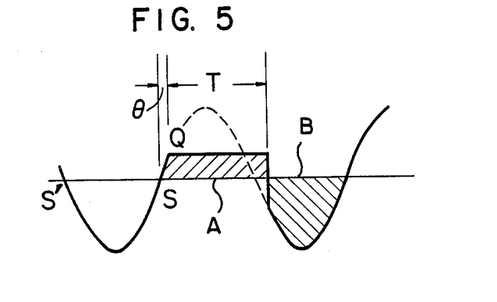
FIG. 5 shows a waveform illustrating a relationship between a previous value holding period and a start of hold time of the previous value holding circuit of the present invention.

In the description of the circuit of FIG. 1B, it was assumed that the time point at which the previous value holding circuit 11 starts to hold the previous value coincides with the zero-crossing point of the periodic noise. However, it need not necessarily coincide with the zero-crossing point of the periodic noise and the noise can be suppressed by balancing the energies of the positive and negative signal portions of the periodic noise. As seen from FIG. 2 (e), a cause of the remaining noise is an imbalance of the positive and negative energies of the waveform produced by holding the periodic noise. In other words, the cause is that an integrated value is not zero. This will be further explained with reference to FIGS. 5 and 6. The periodic noise may be regarded as a sine wave having a frequency $f_H$ (horizontal scan frequency or 15.734 KHz). When this signal is held for T seconds from a time point Q as shown in FIG. 5, an imbalance of the positive and negative energies on the waveform is produced due to a difference between the areas of the hatched portion A and the hatched portion B. As a result, noise remains even after the periodic noise has been attenuated by the lowpass filter. In order to suppress such noise, the start of the hold time is controlled such that the difference between the areas of the hatched portions A and B becomes zero so that the imbalance of the positive and negative energies on the waveform disappears. Assuming that the start of the hold time point Q is at a phase of $\theta$ degree (360 degrees=$1/f_H$ seconds$\approx$63.5 microseconds) relative to a reference time point S, the start of the hold time point which brings the difference between the areas of the hatched portions A and B to zero is defined by the following equation:

$$\theta = \tan^{-1} \frac{\frac{1}{2\pi f_H}(\cos 360 f_H T - 1)}{\frac{1}{2\pi f_H} \sin 360 f_H T - T} \quad (1)$$

Figure 6:
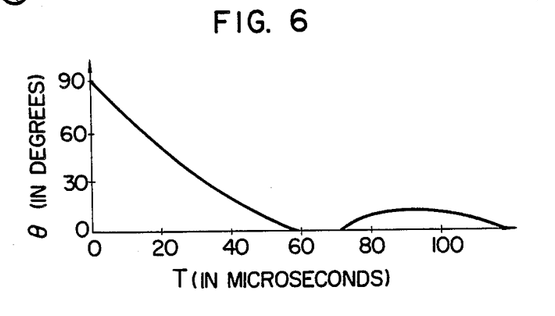
FIG. 6 shows a characteristic chart illustrating a relationship between the previous value holding period and the start of hold time of the previous value holding circuit of the present invention.

This equation determines the phase $\theta$ of the start of the hold time point which minimizes an error holding noise for the holding time period T. The relationship between T and $\theta$ is shown in FIG. 6. Accordingly, when the signal holding time period T is given, the start the hold time point $\theta$ is determined. For example, when T=63.5 microseconds, the error holding noise is minimum at $\theta=0$ or when the point Q coincides with the point S.

This can be realized by varying the duty factor of the monostable multivibrator 15 of FIG. 1B for a given pulse duration of the holding period signal shown by the waveform (f) of FIG. 3. The pulse duration of the output signal of the multivibrator 15 is varied such that the rising edge and the falling edge of the track switching synchronizing signal produced by the flip-flop circuit 17 coincide with the points which result in zero integration value of the periodic noise.

In FIG. 5, the start of the hold time point Q was assumed to be in a positive region of the waveform. When it is assumed to be in a negative region, a point S' in FIG. 5 may be used as a reference time point so that the relationship shown in FIG. 6 is equally applied. In any case, the error holding noise can be suppressed by controlling the start of the hold time point such that the imbalance of the positive and negative energies on the waveform or the integrated value becomes zero.

The elimination of the periodic noise has been described for the case where no signal is present. When the audio signal has been recorded, it is necessary to prevent the deterioration of the audio signal when the previous value is held.

Figure 7:
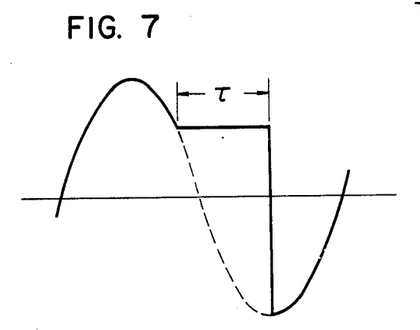
FIG. 7 shows a waveform of a signal when a previous value is held.
Figure 8:
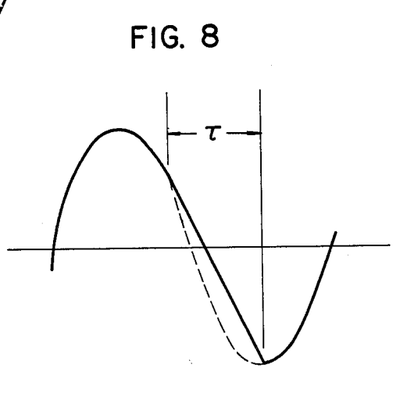
FIG. 8 shows a waveform of a signal when a holding signal is interpolated by first order approximation.
Figure 9:
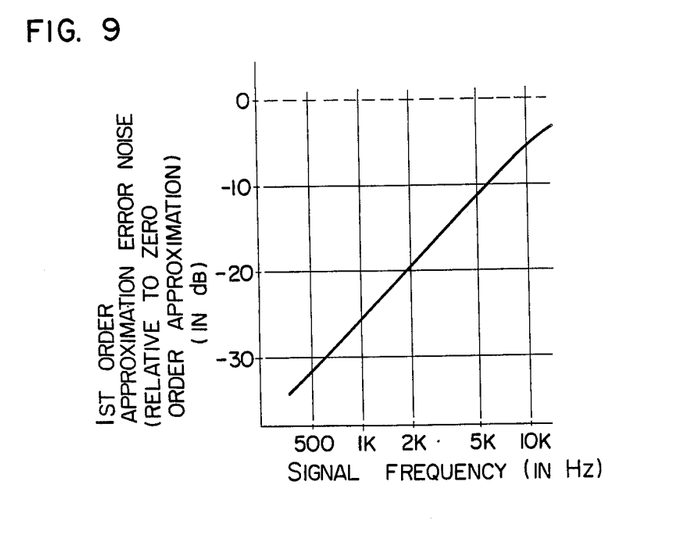
FIG. 9 shows a characteristic chart illustrating an effect of noise suppression by the first order approximation interpolation.

FIG. 7 shows a waveform having noise eliminated by zero order approximation by a time period $\tau$ (previous value holding), and FIG. 8 shows a waveform having noise eliminated by first order approximation. While the noise can be substantially eliminated by those methods, the waveform is changed by the approximation error, creating additional noise. The approximation error noise may be considered as a difference between an original waveform and an integrated waveform. That is, the approximation error noise may be represented by a difference between an integration of the waveform (D.C. component) over a given time period including the reproducing track switching portion on the original audio signal and an integration of the approximated waveform over the same time period. Based on the above consideration, the magnitude of the approximation error noise due to a difference of the approximation method with reference to zero order approximation is shown in FIG. 9 in which the original signal is assumed to be a sine wave and the interpolation is made for a given time period of 50 microseconds. As seen from FIG. 9, the first order approximation offers a very significant effect to reduce the noise relative to the zero order approximation, such as approximately 26 dB for the signal frequency of 1 KHz and approximately 20 dB for 2 KHz.

Since the duration of the noise produced in the track switching is determined by the pass band of the reproduced signal before a final demodulated output is produced, the noise duration $\tau$ for each track switching is constant. Accordingly, it is previously known that the noise is produced at the time of track switching and the noise terminates at the time point which is $\tau$ later than the track switching time point. Considering the above, the first order approximation is attained by a simple construction using the demodulated audio signal delayed by the fixed time period $\tau$.

Figure 10:
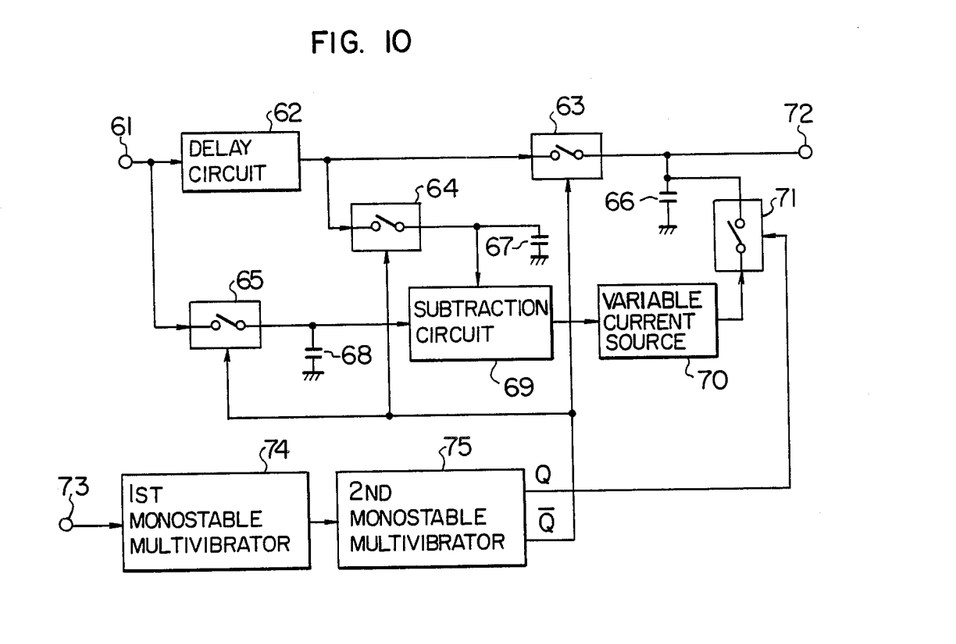
FIG. 10 shows a block diagram of a first order approximation interpolation circuit in the noise elimination circuit of the present invention.

FIG. 10 shows an embodiment of a first order approximation circuit for first order approximating the signal held in the noise elimination circuit of the present invention. In FIG. 10, a first input terminal 61 is an audio signal input terminal to which the output of the low-pass filter 10 shown in FIG. 1A is connected, while a second input terminal 73 is a synchronizing signal input terminal to which the track switching synchronizing signal is applied and to which the output terminal 21 of the D-type flip-flop circuit 17 shown in FIG. 1B is connected. The input terminal 61 is connected to a delay circuit 62, the output of which is connected to input terminals of a first switching circuit 63 and a second switching circuit 64. An output terminal of the first switching circuit 63 is connected to an audio signal output terminal 71 and is also grounded through a first holding capacitor 66. Numeral 65 denotes a third switching circuit having an input terminal connected to the first input terminal 61 and an output terminal connected to a first input of a subtraction circuit 69, which is also grounded through a third holding capacitor 68. An output terminal of the second switching circuit 64 is grounded through a second holding capacitor 67 and connected to a second input of the subtraction circuit 69. Numeral 70 denotes a variable current source having its input connected to the output of the subtraction circuit 69 and its output connected to the input terminal (or output terminal) of a fourth switching circuit 71. Numeral 74 denotes a first monostable multivibrator having an input connected to the second input terminal 73 and an output connected to an input of a second monostable multivibrator 75. The second monostable multivibrator 75 has two output Q and $\overline{Q}$, with the first output Q being connected to a control input of the fourth switching circuit 71 and the second output $\overline{Q}$ being connected to control inputs of the first, second and third switching circuits.

Figure 11:
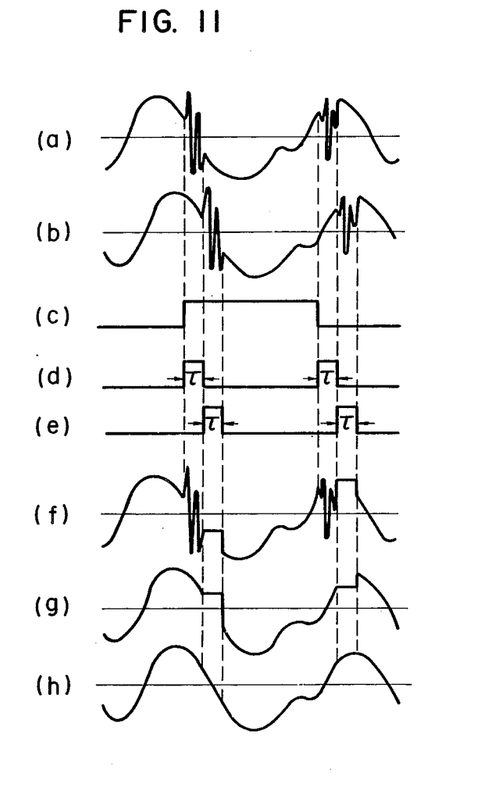
FIG. 11, (a) through (h), shows signal waveforms at various points in the circuit of FIG. 10.

FIG. 11 shows signal waveforms at various points in the circuit of FIG. 10. The operation of the circuit of FIG. 10 is now explained with reference to the signal waveforms of FIG. 11. The waveform (a) of FIG. 11 represents the audio signal demodulated by the FM-demodulator. The audio signal is applied to the input terminal 61, thence to the delay circuit 62 having a delay time of $\tau$ and the switching circuit 65. The audio signal delayed by the time period $\tau$ by the delay circuit 62 is represented by a waveform (b) in FIG. 11. This audio signal is supplied to the switching circuits 63 and 64, which are normally conducting. On the other hand, the track switching signal shown by a waveform (c) of FIG. 11 is applied to the input terminal 73, thence to the monostable multivibrator 74, which produces a pulse having a pulse width $\tau$ as shown by a waveform (d) of FIG. 11. The duration of the output pulse of the monostable multivibrator 74 coincides with the duration of the noise in the input audio signal shown by the waveform (a) of FIG. 11. The monostable multivibrator 75 receives the output of the monostable multivibrator 74 and produces a pulse having the same pulse width $\tau$ as shown by a waveform (e) of FIG. 11 at the second output $\overline{Q}$. The duration of the output pulse of the monostable multivibrator 75 coincides with the duration of the noise in the output signal from the delay circuit 62 shown by the waveform (b) of FIG. 11. The other output of the monostable multivibrator 75 is supplied to the switching circuits 63, 64 and 65 to control the on-off operation of the switches such that the switching circuits 63, 64 and 65 are turned off upon the rise of the pulse shown by the waveform (e) of FIG. 11. Thus, voltages presented at the instant when the switching circuits 65, 64 and 63 are turned off are held at the capacitor 68, 67 and 66, respectively, as shown by waveforms (f), (g) and (h) of FIG. 11. The capacitor 68 holds the voltage presented immediately after the termination of the noise as shown by the waveform (f) of FIG. 11 and the capacitor 67 holds the voltage presented immediately before the noise is produced as shown by the waveform (g) of FIG. 11. A difference between the voltages held in the capacitors 67 and 68 is detected by the subtraction circuit 69, which controls the output current of the variable current source 70 in accordance with the difference of the voltages. For example, if the voltage held in the capacitor 67 is higher than the voltage held in the capacitor 68, the variable current source 70 provides a current corresponding to the differential voltage, and if the voltage held in the capacitor 67 is lower than the voltage held in the capacitor 68, a current corresponding to the differential voltage flows into the variable current source 70.

On the other hand, the switching circuit 71 is normally off and is rendered conductive only when the output pulse at the output terminal Q of the monostable multivibrator 75 (inverted version of the waveform (e) of FIG. 11) is present, accordingly, the capacitor 66 is charged or discharged in accordance with the current of the variable current source 70 or the difference between the voltage presented immediately before the noise is produced and the voltage presented immediately after the termination of the noise. Thus, by controlling the correspondence between the differential voltage of the capacitors 67 and 68 and the output current of the variable current source 70, the voltage across the capacitor 66 or the voltage at the audio signal output terminal 72 can be interpolated by first order approximation around the noise period, as shown by the waveform (h) of FIG. 11.

Figure 12:
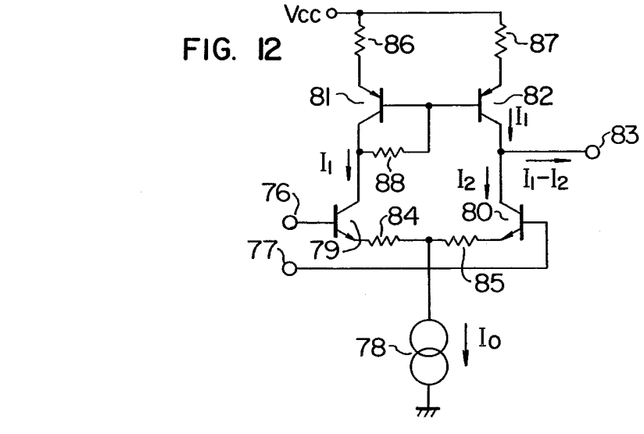
FIG. 12 shows a specific circuit diagram of a subtraction circuit and a variable current source circuit in accordance with the present invention.

A specific circuit diagram of the subtraction circuit 69 and the variable current source 70 is shown in FIG. 12, in which numerals 76 and 77 denote output current control signal input terminals which correspond to the held voltages of the capacitors 67 and 68 of FIG. 10. Transistors 79 and 80 form a differential amplifier so that a collector current $I_1$ of the transistor 79 and a collector current $I_2$ of the transistor 80 flow in accordance with base potential differences of the respective transistors 79 and 80. Neglecting base currents of the transistors 79 and 80, a current $I_0$ flowing into a constant current source 78 is equal to $I_1+I_2$ (constant). The transistors 81 and 82 form a current mirror circuit and a current substantially equal to the collector current of the transistor 79 flows into the collector of the transistor 82. Accordingly, if $I_1>I_2$, a differential current $I_1-I_2$ of the collector currents of the transistors 80 and 82 flows from the current output terminal 83, and if $I_1<I_2$, the current $I_1-I_2$ flows into the terminal 83. Thus, the current is controlled to flow out of or flow into the terminal 83 depending on the difference between the voltages at the terminals 76 and 77.

Figure 13:
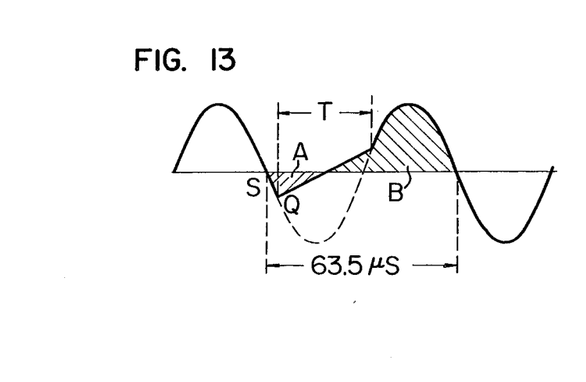
FIG. 13 shows a signal waveform illustrating a relationship between an interpolation period and a start of interpolation time of the first order approximation interpolation circuit.

While the above description has been made with respect to the audio signal, the periodic noise contained in the audio signal is also interpolated by first order approximation when the track is switched. Accordingly, the noise due to the periodic noise cannot be eliminated unless the start time point for the first order approximation interpolation is appropriately determined as is done for the previous value holding. The periodic noise can be regarded as a sine wave having a frequency of $f_H$ (horizontal scan frequency=15.734 KHz). If the first order approximation interpolation is made for T seconds from a time point $\theta$ as shown in FIG. 13, an imbalance of the positive and negative energies on the waveform corresponding to a difference between areas of the hatched portion A and the hatched portion B is produced. As a result, the noise remains even after the periodic noise has been attenuated by the low-pass filter. In order to suppress the noise due to the error interpolation, the start point of the interpolation is controlled so that the difference between the areas of the hatched portions A and B becomes zero, thereby to suppress the imbalance of the positive and negative energies on the waveform. Assuming that the start point $\theta$ of the interpolation is at a phase of $\theta$ degree (360 degrees = $1/f_H$ seconds ≈ 63.5 microseconds) with respect to a reference point S, the start point of the interpolation which results in zero difference between the areas of the hatched portions A and B is determined by the following equation:

$$\theta = \tan^{-1} \frac{\cos 360 f_H T + \pi f_H T \sin 360 f_H T - 1}{\sin 360 f_H T - \pi f_H T \cos 360 f_H T - \pi f_H T} \quad (2)$$

Figure 14:
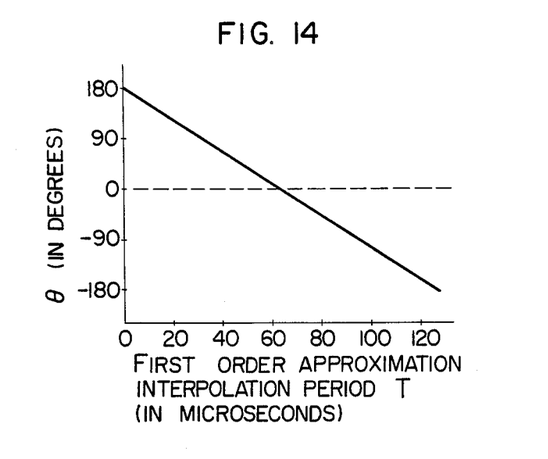
FIG. 14 shows a characteristic chart illustrating a relationship between the interpolation period and the start of interpolation time of the first order approximation interpolation circuit.

This equation defines the phase $\theta$ of the start point of the interpolation which minimizes the noise due to the error interpolation for the interpolation period T. The relationship between T and $\theta$ is shown in FIG. 14. For example, when T=63.5 microseconds, the noise due to the error interpolation is minimum when $\theta$ is zero or when the point Q coincides with the point S. In this manner, the noise due to the error interpolation can be effectively suppressed by controlling the start point of the interpolation such that the imbalance of the positive and negative energies on the waveform or the integrated value becomes zero.

This is attained by varying the duty factor of the monostable multivibrator 15 shown in FIG. 1B to change the pulse duration of the clock pulse produced from the multivibrator 15 in order to control the phases of the rising edge and the falling edge of the track switching synchronizing signal shown by the waveform (c) of FIG. 11 such that the integrated value of the periodic noise which was interpolated by the first order approximation becomes zero.

Figure 15:
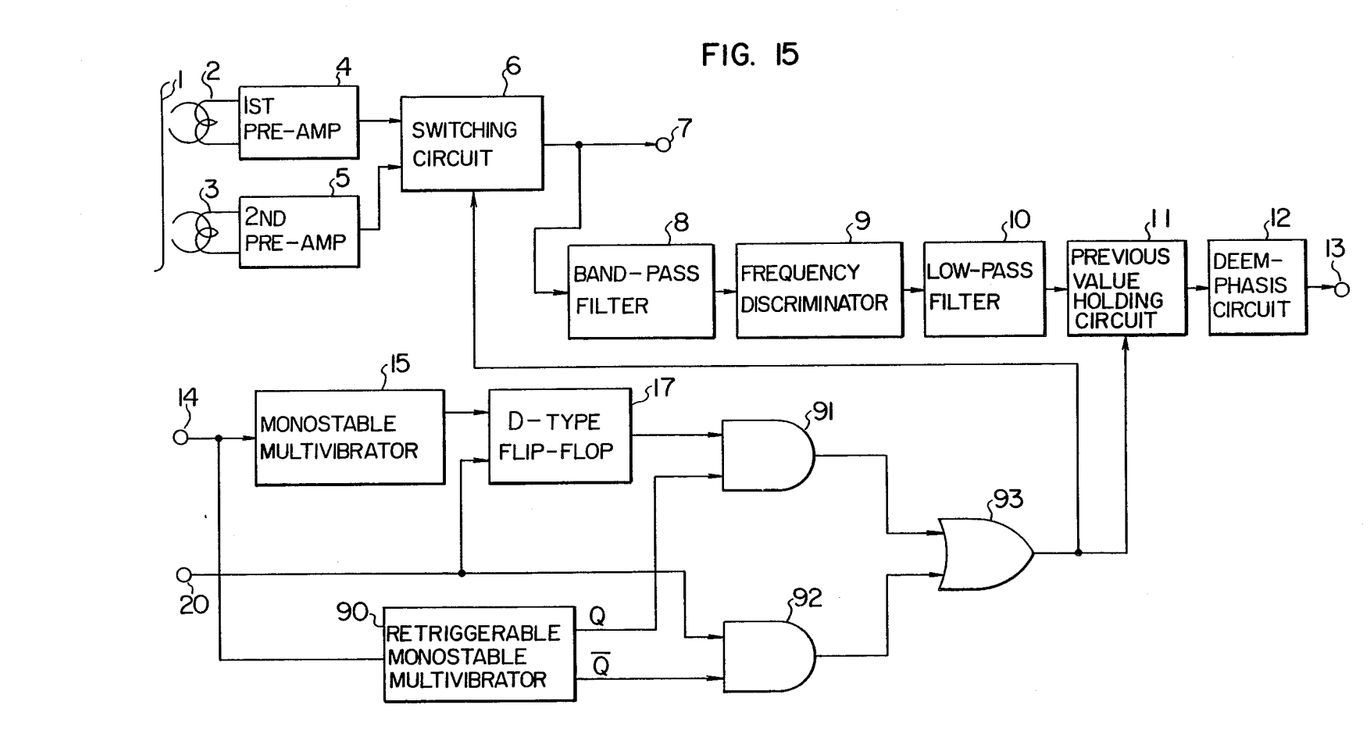
FIG. 15 shows a block diagram of the noise elimination circuit of the present invention having a dropout compensation circuit.

In the noise elimination circuit shown in Fig. 1B, if a dropout occurs near the track switching point so that a horizontal synchronizing signal contained in the video signal is lost, the track switching synchronizing signal which is the output signal from the flip-flop circuit may not be switched, resulting in a significant disturbance in a reproduced image or a deterioration in a sound quality due to discontinuity of the reproduced sound. FIG. 15 shows an embodiment of the noise elimination circuit which enables track switching even when the dropout occurs. In FIG. 15, numeral 90 denotes a second monostable multivibrator having two outputs Q and $\overline{Q}$ and an input connected to the horizontal synchronizing signal input 14. The first output Q is connected to one input of a first AND circuit 91 and the second output $\overline{Q}$ is connected to one input of a second AND circuit 92. The other input of the first AND circuit 91 is connected to the output of the D-type flip-flop 17 and the output of the first AND circuit 91 is connected to one input of an OR circuit 93. The other input of the second AND circuit 92 is connected to the track switching signal input terminal 20 and an output of the second AND circuit 92 is connected to the other input of the OR circuit 93. The output of the OR circuit 93 is connected to the switching circuit 6 and the previous value holding circuit 11.

In the circuit of FIG. 15, when a trigger signal is applied to the second monostable multivibrator 90 when it is active or in an astable state, it restarts the operation. That is, the second monostable multivibrator is a retriggerable monostable multivibrator. If a series of horizontal synchronizing signals are supplied during the astable state of the monostable multivibrator 90, it returns to the initial state each time the horizontal synchronizing signal is supplied. As a result, the astable state persists. The signals produced at the outputs Q and $\overline{Q}$ of the multivibrator 90 are of opposite phase to each other.

Figure 16:
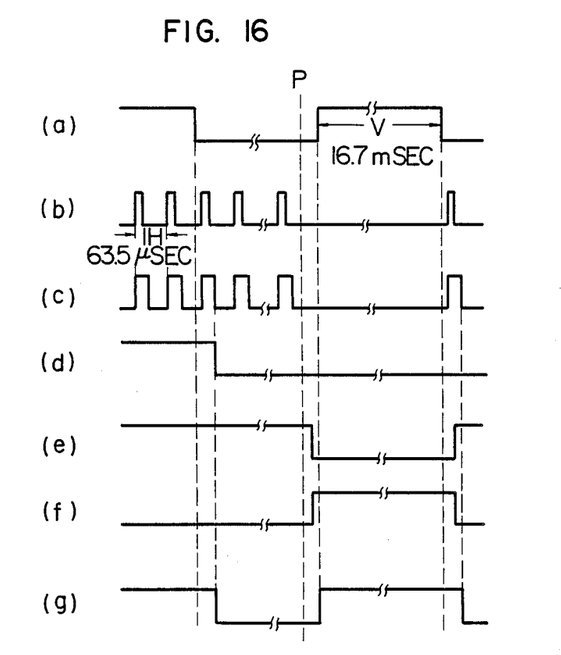
FIG. 16, (a) through (g), shows signal waveforms at various points in the circuit of FIG. 15.

FIG. 16 shows signal waveforms at various points in the circuit of FIG. 15. The waveform (d) represents the output signal of the flip-flop circuit 17, waveforms (e) and (g) represent the pair of output signals of the second multivibrator 90 and the waveform (g) represents the output signal of the OR circuit 93. In a normal state where no dropout occurs, the horizontal synchronizing signal shown by the waveform (b) of FIG. 16 is applied to the input terminal 14 so that the second multivibrator 90 maintains the astable state to produce a high level signal as shown by the waveform (e) of FIG. 16 at the first output Q. Consequently, the AND circuit 91 ANDs the output of the flip-flop circuit 17 and the output Q of the multivibrator 90 to gate the output of the flip-flop circuit 17 to the OR circuit 93. Since the other output $\overline{Q}$ of the second multivibrator 90 produces a low level signal as shown by the waveform (f) of FIG. 16 at this time, the output of the second AND circuit 92 is of low level. As a result, the output signal of the flip-flop circuit 17 is produced from the output of the OR circuit 93 as the track switching synchronizing signal.

In FIG. 16, if a dropout occurs at a point P near the track switching point, the horizontal synchronizing signal is lost thereafter. The second multivibrator 90 then changes from the astable state to a stable state so that the output conditions of the pair of output signals Q and $\overline{Q}$ are inverted. As a result, the output of the first AND circuit 91 assumes the low level and the output of the second AND circuit 92 produces the track switching signal applied to the input terminal 20. Accordingly, the output of the OR circuit 93 produces the track switching signal supplied to the input terminal 20 so that malfunction of the switching circuit 6 is prevented.

Figure 17:
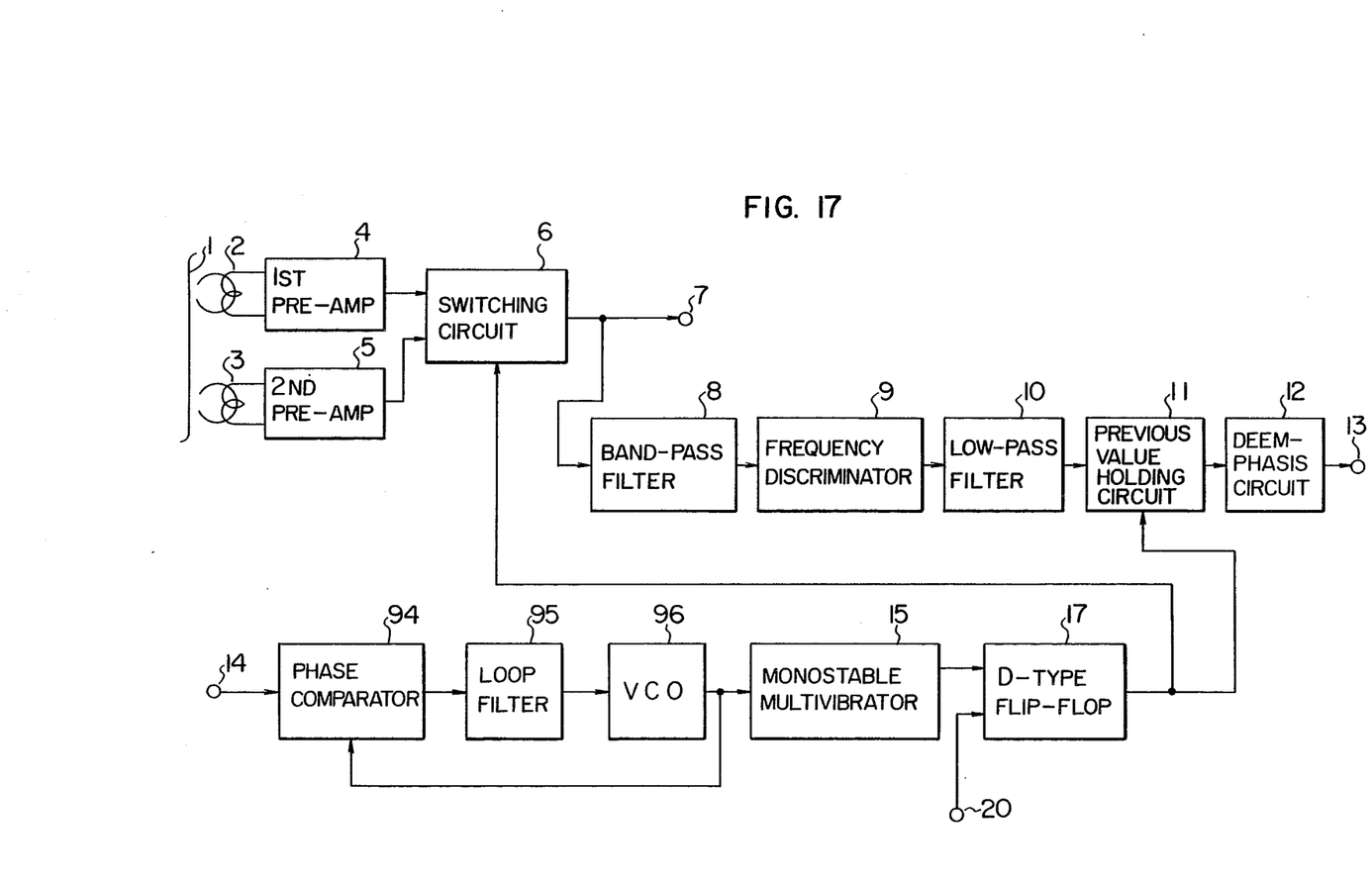
FIG. 17 shows a circuit diagram of the noise elimination circuit of the present invention having another dropout compensation circuit.

FIG. 17 shows a noise elimination circuit having another dropout compensation circuit for compensating for a dropout. In the present circuit, a phase comparator 94, a loop filter 95 and a voltage controlled oscillator 96 are connected between the input terminal 14 to which the horizontal synchronizing signal is applied and the input of the monostable multivibrator 15. In the present circuit, the oscillation frequency of the voltage controlled oscillator 96 is set to the frequency of the horizontal synchronizing signal. In a normal state, the phase of the oscillator output signal is compared with the phase of the horizontal synchronizing signal applied to the input terminal 14 to lock the phase of the oscillator output signal to the phase of the horizontal synchronizing signal. As a result, even if a dropout occurs and the horizontal synchronizing signal is lost, the monostable multivibrator 15 produces the clock pulse because the voltage controlled oscillator 96 continues to oscillate. Thus the track switching is carried out normally.

As described hereinabove, according to the present invention, even if the periodic noise related to the period of the reproduced horizontal synchronizing signal is present in the reproduced signal of the frequency modulated audio signal, a large amplitude noise due to the discontinuity of the FM signal at the reproducing track switching point can be essentially eliminated with a simple circuit configuration without pulsive noise of a period of the reproducing track switching and without the deterioration of the quality of the reproduced sound.

What is claimed is:

1. A noise elimination circuit in combination with a magnetic tape recording and reproducing apparatus including a plurality of signal reproducing rotary heads for reproducing frequency modulated video signal and frequency modulated audio signals from a magnetic tape on which said video and audio signals have been previously recorded along tracks disposed transversely of the direction of movement of said magnetic tape; means for rotating said heads to scan said magnetic tape along said tracks for said reproduction; switching means connected to receive the outputs of said plurality of rotary heads for changing over said outputs periodically; filter means connected to receive the output of said switching means for separating frequency modulated audio signals from frequency modulated video signals; and discriminator means connected to receive the frequency modulated audio signals from said filter means for demodulating said modulated audio signals; the noise elimination circuit comprising:

means for receiving a track switching signal representative of the phase of rotation of said rotating heads and a horizontal sync signal contained in said frequency modulated video signals and for generating in accordance with said track switching signal and said horizontal sync signal a track switching synchronizing signal for synchronizing the changeover operation of said switching means with the phase of said horizontal sync signal;

holding means connected to receive the output of said discriminator means for holding the level of said output of said discriminator means in response to an applied control signal;

means for generating said control signal for controlling said holding means to effect synchronization of the holding operation of said holding means with the phase of said track switching synchronizing signal and for adjustment of the duration of time of said holding operation;

means for supplying said track switching synchronizing signal from said track switching signal generating means to said switching means; and means for supplying said control signal from said control signal generating means to said holding means.

2. A noise elimination circuit according to claim 1, wherein said control signal generating means comprises a differentiation circuit connected to receive said track switching synchronizing signal and a monostable multivibrator having its input connected to the output of said differentiation circuit and providing an output in the form of said control signal to said holding means.

3. A noise elimination circuit according to claim 1, wherein said track switching synchronizing signal generating means comprises a monostable multivibrator having its input connected to receive said horizontal sync signal, a flip-flop circuit having one input connected to the output of said monostable multivibrator and a second input connected to receive said track switching signal, a retriggerable monostable multivibrator connected to receive said horizontal sync signal, a first AND gate having one input connected to the output of said flip-flop circuit and another input connected to one output of said retriggerable monostable multivibrator, a second AND gate having one input connected to receive said track switching signal and another input connected to a second output of said retriggerable monostable multivibrator, and an OR gate having inputs connected to the respective outputs of said first and second AND gates and an output connected to said switching means and said control signal generating means.

4. A noise elimination circuit according to Claim 1 wherein said signal holding means includes first level holder means for holding a signal level of the audio signal occurring at a first time point of the audio signal and second level holder means for holding a signal level of the audio signal occurring at a second time point of the audio signal, and means for linearly interpolating the audio signal held in accordance with the difference between said signal levels held by said first and second level holder means.

5. A noise elimination circuit according to claim 1 wherein said track switching synchronizing signal generating means includes means synchronized with a phase of an oscillation output of a voltage controlled oscillator phase-synchronized with a phase of said horizontal sync signal.

* * * * *